(12) United States Patent
Dickert et al.

(10) Patent No.: US 11,485,509 B2
(45) Date of Patent: Nov. 1, 2022

(54) ARRANGEMENT FOR COUPLING FAIRING PANEL TO ENGINE CASING

(71) Applicant: Rolls-Royce Deutschland Ltd & Co KG, Blankenfelde-Mahlow (DE)

(72) Inventors: Uwe Dickert, Berlin (DE); Christoph Juengling, Berlin (DE); Muthukrishnan Muniyandi, Berlin (DE); Fabian Riveros, Madrid (ES)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 820 days.

(21) Appl. No.: 16/412,724

(22) Filed: May 15, 2019

(65) Prior Publication Data

US 2020/0361619 A1 Nov. 19, 2020

(51) Int. Cl.
| | |
|---|---|
| *B64D 29/06* | (2006.01) |
| *F01D 25/24* | (2006.01) |
| *F02C 7/20* | (2006.01) |
| *F16M 13/02* | (2006.01) |
| *F16M 1/00* | (2006.01) |

(52) U.S. Cl.
CPC ........... *B64D 29/06* (2013.01); *F01D 25/243* (2013.01); *F02C 7/20* (2013.01); *F16M 1/00* (2013.01); *F16M 13/02* (2013.01)

(58) Field of Classification Search
CPC ..... F02C 7/04; F02C 7/20; B64D 33/02; B64D 29/06; F01D 25/243
See application file for complete search history.

(56) References Cited

U.S. PATENT DOCUMENTS

| | | | | |
|---|---|---|---|---|
| 2006/0145001 | A1* | 7/2006 | Smith | B64D 29/06 244/11 OB |
| 2016/0377090 | A1* | 12/2016 | Brown | B64D 33/02 415/9 |
| 2020/0002016 | A1* | 1/2020 | Breton | B64D 29/00 |

* cited by examiner

*Primary Examiner* — Andrew H Nguyen
(74) *Attorney, Agent, or Firm* — Shuttleworth & Ingersoll, PLC; Timothy Klima

(57) ABSTRACT

Disclosed is an arrangement for coupling a fairing panel to an engine casing. The arrangement includes a pair of rigid brackets having a specific stiffness, wherein the pair of rigid brackets couple a first side of the fairing panel to a first side of the engine casing. The arrangement further includes a pair of flexible brackets comprising a first flexible bracket having a first stiffness and a second flexible bracket having a second stiffness more than the first stiffness. Moreover, the first stiffness and the second stiffness are less than the specific stiffness of the pair of rigid brackets. Furthermore, the pair of flexible brackets couple a second side opposite to the first side of the fairing panel to a second side opposite to the first side of the engine casing.

4 Claims, 2 Drawing Sheets

ARRANGEMENT FOR COUPLING FAIRING PANEL TO ENGINE CASING

TECHNICAL FIELD

The present disclosure relates generally to aircrafts; and more specifically, to arrangements for coupling a fairing panel to an aircraft engine casing.

BACKGROUND

Generally, a fairing panel refers to a structure that is primarily used to produce a smooth outline and reduce aerodynamic drag. The fairing panel may be employed in various types of vehicles, for example, as an aircraft fairing panel, a motorbike fairing panel, a payload fairing panel and the like. Additionally, the fairing panels may also be used to camouflage and safeguard components of the vehicles. In an example, when the fairing panel is employed in aircrafts, it can be arranged at several places such as engine casings, cockpit, flap-track, tail cones, wing tips, and so forth.

Conventionally, the fairing panels are coupled to the engine casings in aircrafts via attachments. Such attachments enable to provide a flexible connection between the fairing panel and the engine casing, to account for differential thermal displacements experienced between the fairing panel and the engine casing (such as, due to hot air exhausted during operation of engine).

In special cases, the fairing panels may accommodate heavy auxiliary equipment thereon, such as a Turbine Case Cooling Valve (TCCV). It will be appreciated that, due to a heavy weight of the TCCV, the fairing panel is susceptible to vibrations during the operation of the engine. In most cases the vibration is caused by an out of balance condition of the engine which leads to an increase in an amount of vibrations experienced. Such an increase in the amount of vibrations causes a consequent increase in vibrations in the engine casing, that are in turn, transmitted via the attachments to the fairing panel. Such increase in the vibrations may excite mode shapes of the fairing, typically bending modes. These modes also lead to a bending in the attachments. Therefore, the fairing panels undergoing the bending may lead to structural failure of the attachments, consequently, hampering an operation of the aircraft, causing structural damage thereto and so forth. Therefore, such attachments used to couple the fairing panels to the engine casings are inefficient, unreliable and may cause serious damage to the aircraft.

Therefore, in light of the foregoing discussion, there exists a need to overcome the aforementioned problems associated with the conventional attachments used to couple the fairing panel to the engine casing in the aircraft.

SUMMARY

The present disclosure seeks to provide an arrangement for coupling a fairing panel to an engine casing. The present disclosure seeks to provide a solution to the existing problems associated with failure of attachments used to couple the fairing panel to the engine casing of an aircraft, due to transmission of vibrations and mechanical stress from the engine casing to the fairing panel via the attachments. An aim of the present disclosure is to provide a solution that overcomes at least partially the problems encountered in prior art, and provides an efficient, reliable and a cost-effective arrangement that can be readily employed for coupling the fairing panel and the engine casing.

Embodiments of the present disclosure provide an arrangement for coupling a fairing panel to an engine casing, the arrangement comprising:
  a pair of rigid brackets having a specific stiffness, wherein the pair of rigid brackets couple a first side of the fairing panel to a first side of the engine casing; and
  a pair of flexible brackets comprising a first flexible bracket having a first stiffness and a second flexible bracket having a second stiffness more than the first stiffness, wherein the first stiffness and the second stiffness are less than the specific stiffness of the pair of rigid brackets, and wherein the pair of flexible brackets couple a second side opposite to the first side of the fairing panel to a second side opposite to the first side of the engine casing.

Embodiments of the present disclosure substantially eliminate or at least partially address the aforementioned problems in the prior art, and provides an efficient, reliable and cost-effective arrangement for coupling the fairing panel to the engine casing of an aircraft, such that the arrangement is able to withstand high amount of vibrations and mechanical stress transmitted from the engine casing, during operation of engine of the aircraft.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
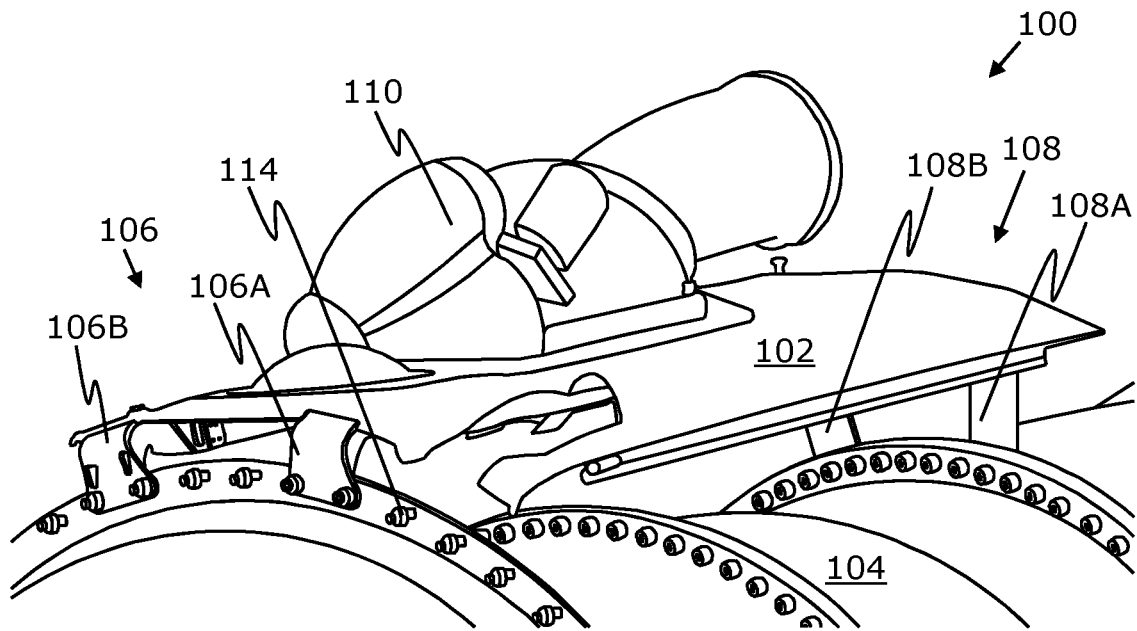
FIG. 1 is a front-perspective view of an arrangement for coupling a fairing panel to an engine casing, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

Embodiments of the present disclosure provide an arrangement for coupling a fairing panel to an engine casing, the arrangement comprising:
- a pair of rigid brackets having a specific stiffness, wherein the pair of rigid brackets couple a first side of the fairing panel to a first side of the engine casing; and
- a pair of flexible brackets comprising a first flexible bracket having a first stiffness and a second flexible bracket having a second stiffness more than the first stiffness, wherein the first stiffness and the second stiffness are less than the specific stiffness of the pair of rigid brackets, and wherein the pair of flexible brackets couple a second side opposite to the first side of the fairing panel to a second side opposite to the first side of the engine casing.

The arrangement for coupling the fairing panel to the engine casing comprises the pair of rigid brackets, such that each rigid bracket possesses a same shape and thickness, therefore, the stiffness of each rigid bracket of the pair of rigid brackets is equal. Moreover, the stiffness of the pair of rigid brackets is substantially high as compared to the first stiffness and the second stiffness of the first flexible bracket and the second flexible bracket respectively. Consequently, as the pair of rigid brackets couple the first side of the fairing panel to the first side of the engine casing, the pair of rigid brackets restricts a relative movement therebetween. Subsequently, rigid coupling is achieved between the first side of the fairing panel and the first side of the engine casing. The arrangement further comprises the pair of flexible brackets having the first flexible bracket having the first stiffness and the second flexible bracket having the second stiffness. Furthermore, the pair of flexible brackets flexibly couple the second side opposite to the first side of the fairing panel, to the second side opposite to the first side of the engine casing. Such an employment of the pair of flexible brackets having different stiffnesses allows the fairing panel to experience torsion as opposed to bending (experienced by the fairing panel in case when the fairing panel is coupled to the engine casing via a conventional pair of flexible brackets having a same stiffness as each other) under influence of vibrations from the engine casing. It will be appreciated that, the fairing panel experiences a large amount of vibrations transmitted from the engine casing via the arrangement, thus, leading the attachment bracket to experience stress. When the attachment brackets allow bending modes of the panel, the engine out of balance can easily excite this vibration mode. When the brackets allow torsion of the panel, the engine out of balance will not excite this vibration mode and thereby safeguard the attachment brackets from structural failure and the mounted unit from high vibration. Therefore, the present disclosure provides the arrangement for coupling the fairing panel to the engine casing that is efficient, reliable and prevents the aircraft from experiencing serious damage that may be caused due to the structural failure of the attachment brackets.

The present disclosure provides the arrangement for coupling the fairing panel to the engine casing. The engine casing can be implemented as a substantially cylindrical structure for housing an engine of an aircraft. Furthermore, the fairing panel can be implemented as a curved, rectangular panel that can be arranged on top of the engine casing. Optionally, the fairing panel and/or the engine casing is manufactured using steel, aluminum, titanium or alloys thereof. Moreover, the fairing panel is arranged on the engine casing by employing the arrangement, to provide a separation between the fairing panel and the engine casing.

The arrangement comprises the pair of rigid brackets having the specific stiffness. Throughout the present disclosure, the term "stiffness" refers to a property associated with an object (such as the brackets) that allows the object to resist deformation in response to a force applied thereupon. It will be appreciated that the stiffness is inverse of flexibility of the object. The more the stiffness of the brackets, the more is an ability of the brackets to resist external forces such as vibrations without experiencing deformation. The pair of rigid brackets are solid structures having an identical shape and thickness, such as to have the same stiffness. Optionally, the pair of rigid brackets are solid L-shaped structures. More optionally, each rigid bracket of the pair of rigid brackets comprises at least one supporting portion coupled in between two planar faces. Such a supporting portion provides additional mechanical strength to each of the pair of rigid brackets. Furthermore, each rigid bracket of the pair of rigid brackets can be manufactured using a same material. For example, the pair of rigid brackets may be manufactured using steel, aluminum, titanium or alloys thereof. Notably, the stiffness associated with the pair of rigid brackets manufactured using the abovementioned materials is high (as compared to a stiffness of each of the pair of flexible brackets, explained in detail herein later). The pair of rigid brackets couple the first side of the fairing panel to the first side of the engine casing. The stiffness of the pair of rigid brackets is kept high in order to provide rigid coupling between the first side of the fairing panel and the first side of the engine casing. One of the faces of each of the rigid bracket is coupled to the first side of the fairing panel, whereas the other face of each of the rigid bracket is coupled to the first side of the engine casing. Furthermore, each of the rigid brackets is coupled to the first side of the fairing panel and the first side of the engine casing, such that the rigid brackets are arranged in parallel and are spaced apart from each other. More optionally, the pair of rigid brackets and the fairing panel may be manufactured using steel, aluminum, titanium or alloys thereof.

Moreover, the arrangement comprises the pair of flexible brackets comprising the first flexible bracket having the first stiffness and the second flexible bracket having the second stiffness more than the first stiffness. The first stiffness and the second stiffness are less than the specific stiffness of the pair of rigid brackets. The first flexible bracket and the second flexible bracket are solid structures having two planar faces. Optionally, the first flexible bracket and the second flexible bracket are L-shaped structures. The pair of flexible brackets couple the second side opposite to the first side of the fairing panel to the second side opposite to the first side of the engine casing. The first stiffness of the first flexible bracket is such that the first flexible bracket flexibly couples the second side opposite to the first side of the fairing panel, to the second side opposite to the first side of the engine casing. Similarly, the second stiffness of the second flexible bracket is such that the second flexible bracket flexibly couples the second side opposite to the first side of the fairing panel, to the second side opposite to the first side of the engine casing. The first stiffness of the first flexible bracket differs from the second stiffness of the second flexible bracket, such that the second stiffness is more than the first stiffness. Further, the first stiffness of the first flexible bracket and the second stiffness of the second flexible bracket are less than the specific stiffness of the pair of rigid brackets. The first stiffness and the second stiffness are kept less than the specific stiffness in order to provide the flexible coupling between the second side of the fairing panel and the second side of the engine casing, by enabling the pair of flexible brackets to deform from an original shape thereof when a force is applied (such as, due to vibrations experienced by the engine casing) and to regain the original shape when the applied force is removed. Optionally, the second flexible bracket comprises an angular portion coupled in between two planar faces of the second flexible bracket to provide additional tensile strength to the second flexible bracket, thereby, providing an increased second stiffness to the second flexible bracket as compared to the first stiffness of the first flexible bracket.

It will be appreciated that, an engine that the engine casing is associated therewith (such as the engine of the aircraft), when in operation, exhausts a large amount of heat. Therefore, a temperature of the engine is extremely high during the operation thereof. Consequently, such heat exhausted by the engine is transmitted to the engine casing that encloses the engine, (such as, by convection), thus, increasing a temperature thereof. On the contrary, the fairing panel that is coupled to the engine casing has a relatively lower temperature as compared to the engine casing during operation of the engine as it is from the outside washed by cold bypass air. The thermal expansion of the fairing is small compared to the thermal expansion of the casing. Therefore, the arrangement for coupling the fairing panel to the engine casing is provided, that accounts for the differential thermal expansion of the fairing panel and the casing. The pair of rigid brackets is provided to couple the first side of the fairing panel to the first side of the engine casing, such that the fairing panel remains rigidly fixed to the engine casing. The pair of flexible brackets is provided to couple the second side of the fairing panel to the second side of the engine casing, such that when the casing experiences the thermal expansion, the pair of flexible brackets deforms to compensate the different thermal expansion of casing and fairing panel.

Optionally, the fairing panel may comprise a slot for accommodating auxiliary equipment, such as a Turbine Case Cooling Valve (TCCV). Notably, the TCCV is a heavy equipment. Furthermore, during operation of the engine, the engine casing is susceptible to vibrations that are transmitted via the pair of rigid brackets and the pair of flexible brackets to the fairing panel. It will be appreciated that such vibrations are further transmitted to the TCCV accommodated on the fairing panel. In most cases the vibration is caused by an out of balance condition of the engine, which leads to an increase in an amount of vibrations experienced by the engine. Such an increase in the vibrations in the engine causes increase in vibrations in the engine casing, and in turn leads to increase in vibrations in the fairing panel. It will be appreciated that employment of the pair of flexible brackets having different stiffness (such as the first stiffness and the second stiffness) allows the fairing panel to experience torsion as opposed to experiencing bending that is experienced by the fairing panel in case when the fairing panel is coupled to the engine casing via a conventional pair of flexible brackets having same stiffness. For example, when vibrations are transmitted by the engine casing to the pair of rigid brackets and the pair of flexible brackets, the pair of rigid brackets experience minimal deformation. Furthermore, each of the first flexible bracket and the second flexible bracket having lower stiffness than the pair of rigid brackets experience a higher amount of deformation as compared to the pair of rigid brackets. However, as the first stiffness of the first flexible bracket is less than the second stiffness of the second flexible bracket, the first flexible bracket experiences a higher amount of deformation due to the vibrations, as compared to deformation experienced by the second flexible bracket. Consequently, the deformation experienced by the pair of flexible brackets is transmitted to the fairing panel in an uneven manner, such that, the fairing panel develops mainly torsion modes along an axis between the first flexible bracket and the second flexible bracket. When the brackets allow torsion of the panel, the engine out of balance will not excite this vibration mode and thereby safeguard the attachment brackets from structural failure. Consequently, the arrangement enables to prevent failure of the attachment brackets and loss of the TCCV accommodated on the fairing panel, thus, enabling reliable operation of the aircraft and preventing damage thereto.

In an embodiment, a ratio of the second stiffness to the first stiffness is greater than or equal to 10. Values of the second stiffness and the first stiffness are such that, the second stiffness is at least 10 times the first stiffness. Consequently, the first flexible bracket experiences an increased amount of deformation under the same amount of vibrations as compared to an amount of deformation experienced by the second flexible bracket. For example, if the second stiffness of the second flexible bracket is 100, the first stiffness of the first flexible bracket may be kept 10, such that the ratio of the second stiffness to the first stiffness is 10. Such a ratio enables the fairing panel to experience torsion, as the deformation experienced by the fairing panel is unevenly distributed and not concentrated along a fixed axis, therefore, the pair of flexible brackets having the ratio greater than or equal to 10 safeguards the attachment brackets from structural failure.

In an embodiment, the first flexible bracket is manufactured using a first material and the second flexible bracket is manufactured using a second material. In order to achieve the second stiffness more than the first stiffness, the second flexible bracket and the first flexible bracket may be manufactured using different materials. In an example, the first material used for manufacturing the first flexible bracket may be aluminum, and the second material used for manufacturing the second flexible bracket may be steel. In another example, the first material used for manufacturing the first flexible bracket may be an alloy of aluminum, and the second material used for manufacturing the second flexible bracket may be steel.

In an embodiment, the first flexible bracket has at least one of a different shape, and/or a different thickness as compared to the second flexible bracket. As mentioned above, the second stiffness is more than the first stiffness, therefore, in order to achieve a differential stiffness (i.e. a difference in the second stiffness as compared to the first stiffness), the first flexible bracket and the second flexible bracket may be manufactured to have the different shape, the different thickness or both. For example, the second flexible bracket may be manufactured with the angular support, whereas the first flexible bracket may be manufactured without the angular support in order to achieve the second stiffness more than the first stiffness. The first flexible bracket may have a different thickness than that of the second flexible bracket, such that the thickness of the first flexible bracket is less than the thickness of the second flexible bracket, in order to achieve the second stiffness more than the first stiffness. Such a difference in shape and/or thickness of the first flexible bracket and the second flexible bracket allows for the aforementioned ratio of the second stiffness and the first stiffness to be greater than or equal to 10.

In an embodiment, each bracket of the pair of rigid brackets and each bracket of the pair of flexible brackets comprises at least two apertures to accommodate a fastener for coupling the bracket to each of the fairing panel and the engine casing. As discussed herein above, each bracket of the pair of rigid brackets comprises the two planar faces. The planar face coupled to the fairing panel may comprise one aperture to accommodate the fastener, whereas the other planar face of each of the bracket coupled to the engine casing may comprise another aperture to accommodate the fastener. Optionally, the planar face coupled to the fairing panel may comprise more than one aperture to accommodate the fastener in each aperture and the other planar face of each of the bracket coupled to the engine casing may comprise more than one aperture to accommodate the fastener in each aperture. Furthermore, the first flexible bracket and the second flexible bracket comprise two planar faces. The planar face of the first flexible bracket coupled to the fairing panel may comprise one aperture to accommodate the fastener, whereas the other planar face of the first flexible bracket coupled to the engine casing may comprise another aperture to accommodate the fastener. The planar face of the second flexible bracket coupled to the fairing panel may comprise one aperture to accommodate the fastener, whereas the other planar face of the second flexible bracket coupled to the engine casing may comprise another aperture to accommodate the fastener. Optionally, the planar face of the first flexible bracket coupled to the fairing panel may comprise more than one aperture to accommodate the fastener in each aperture, whereas the other planar face of the first flexible bracket coupled to the engine casing may comprise more than one aperture to accommodate the fastener in each aperture, and the planar face of the second flexible bracket coupled to the fairing panel may comprise more than one aperture to accommodate the fastener in each aperture, whereas the other planar face of the second flexible bracket coupled to the engine casing may comprise more than one aperture to accommodate the fastener in each aperture.

Optionally, the fastener may be one of various types of fasteners, such as nuts and bolts, screws, rivets and the like. More optionally, the pair of rigid brackets and the pair of flexible brackets may be coupled to the fairing panel and the engine casing by welding the corresponding planar faces to the fairing panel and the engine casing respectively.

Optionally, provided is a method for coupling a fairing panel to an engine casing, the method comprising:
  providing a pair of rigid brackets having a specific stiffness;
  coupling, using the pair of rigid brackets, a first side of the fairing panel to a first side of the engine casing;
  providing a pair of flexible brackets comprising a first flexible bracket having a first stiffness and a second flexible bracket having a second stiffness more than the first stiffness, wherein the first stiffness and the second stiffness are less than the specific stiffness of the pair of rigid brackets; and
  coupling, using the pair of flexible brackets, a second side opposite to the first side of the fairing panel to a second side opposite to the first side of the engine casing.

Optionally, a ratio of the second stiffness to the first stiffness is greater than or equal to 10.

Optionally, the first flexible bracket has at least one of: a different shape, a different thickness as compared to the second flexible bracket.

Optionally, the first flexible bracket is manufactured using a first material and the second flexible bracket is manufactured using a second material.

Optionally, each bracket of the pair of rigid brackets and each bracket of the pair of flexible brackets comprises at least two apertures to accommodate a fastener for coupling the bracket to each of the fairing panel and the engine casing.

DETAILED DESCRIPTION OF THE DRAWINGS

Figure 2:
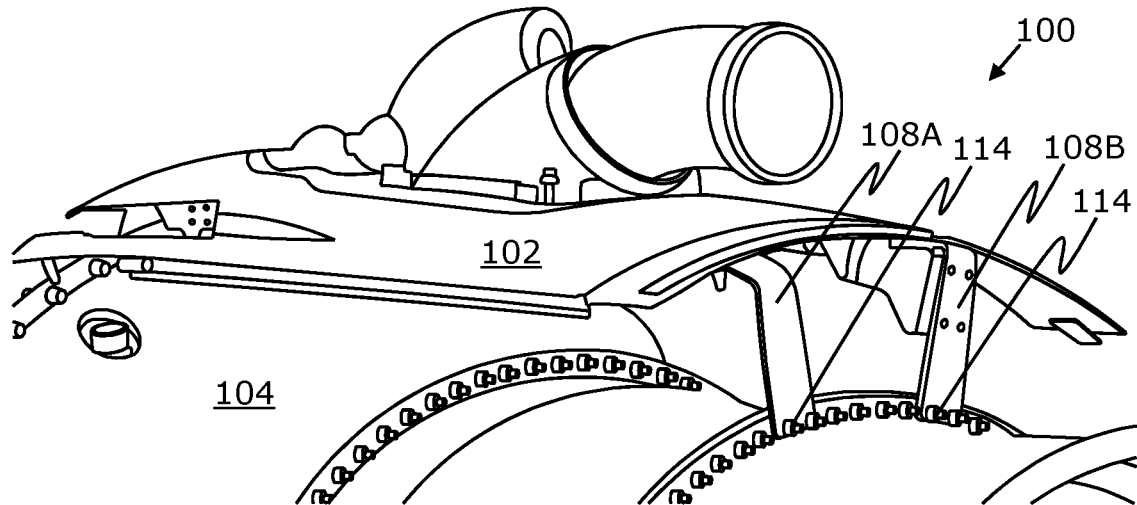
FIG. 2 is a rear-perspective view of the arrangement of FIG. 1, in accordance with an embodiment of the present disclosure.
Figure 3:
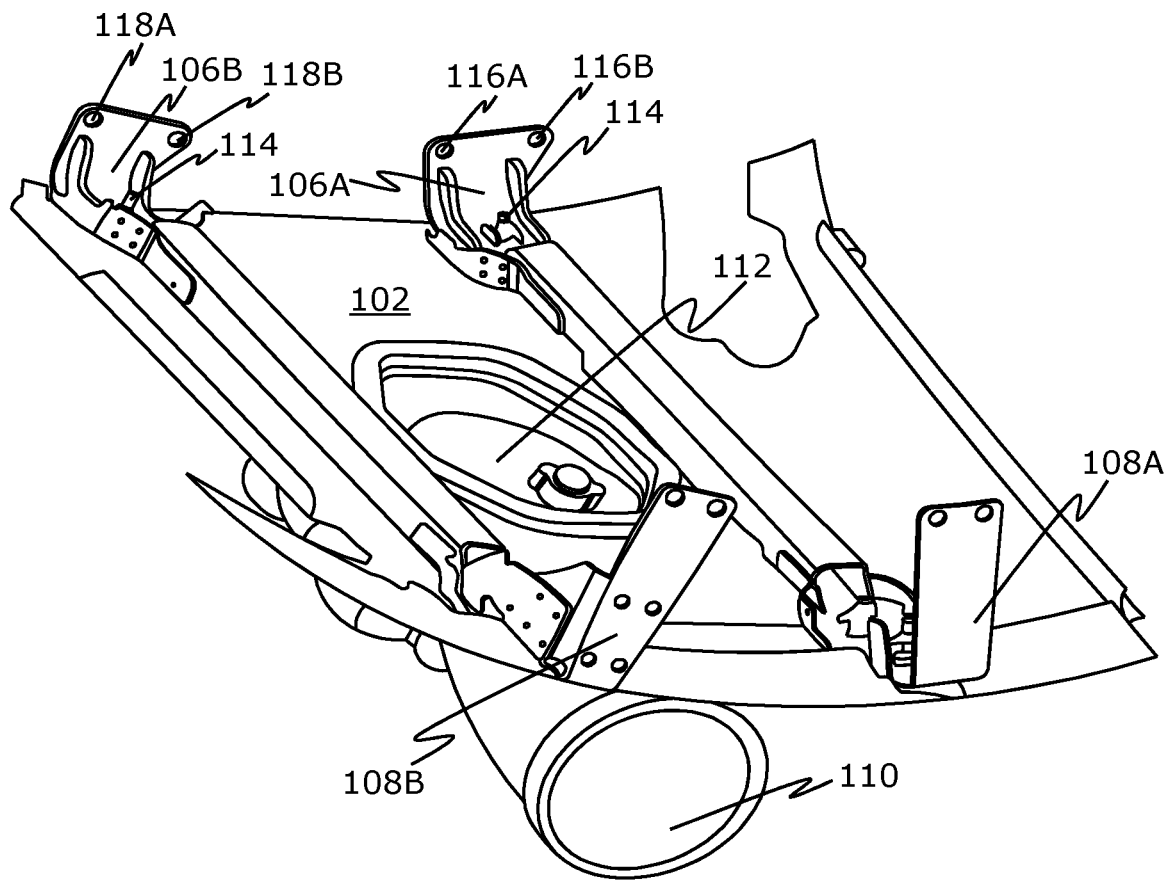
FIG. 3 is a rear-perspective view of the bottom of the fairing panel coupled to the arrangement of FIG. 1, in accordance with an embodiment of the present disclosure.

Referring to FIG. 1, there is shown a front-perspective view of an arrangement 100 for coupling a fairing panel 102 to an engine casing 104, in accordance with an embodiment of the present disclosure. As shown, the arrangement 100 comprises a pair of rigid brackets 106 and a pair of flexible brackets 108. The pair of rigid brackets 106 comprise two rigid brackets, such as a rigid bracket 106A and a rigid bracket 106B. The pair of rigid brackets 106 are L-shaped structures having a planar face at each end thereof, such that one planar face of each of the pair of rigid brackets 106 is coupled to a first side of the fairing panel 102, whereas another planar face of each of the pair of rigid brackets 106 is coupled to a first side of the engine casing 104. A second side opposite to the first side of the fairing panel 102 is coupled to a second side opposite to the first side of the engine casing 104 via the pair of flexible brackets 108, such as a first flexible bracket 108A and a second flexible bracket 108B (as shown in FIG. 2). Moreover, there is shown a TCCV 110 accommodated in a slot 112 (as shown in FIG. 3) provided in the fairing panel 102. Furthermore, the pair of rigid brackets 106 is coupled using bolts 114 to the fairing panel 102 and the engine casing 104.

Referring to FIG. 2, there is shown a rear-perspective view of the arrangement 100 of FIG. 1, in accordance with an embodiment of the present disclosure. As shown, the pair of flexible brackets 108, such as the first flexible bracket 108A and the second flexible bracket 108B are L-shaped structures having a planar face at each end thereof, such that one planar face of each of the pair of flexible brackets 108A and 108B is coupled to the second side of the fairing panel 102, whereas another planar face of each of the pair of flexible brackets 108A and 108B is coupled to the second side of the engine casing 104. Moreover, the pair of flexible brackets 108 is coupled using bolts 114 to each of the fairing panel 102 and the engine casing 104.

Referring to FIG. 3, there is shown a rear-perspective view of a bottom of the fairing panel 102 coupled to the arrangement 100 of FIG. 1, in accordance with an embodiment of the present disclosure. As shown, the fairing panel 102 comprises the slot 112 to accommodate the TCCV 110. Moreover, there is shown the pair of rigid brackets 106 (such as the rigid bracket 106A and the rigid bracket 106B) and the pair of flexible brackets 108 (such as the first flexible bracket 108A and the second flexible bracket 108B) coupled to the fairing panel 102, using the bolts 114. Furthermore, as can be seen, each rigid bracket 106A-B of the pair of rigid brackets 106 is identical in shape, whereas a shape of the first flexible bracket 108A differs from a shape of the second flexible bracket 108B differs. Furthermore, the rigid bracket 106A comprises two apertures 116A and 116B, and the rigid bracket 106B comprises two apertures 118A and 118B to accommodate the bolts 114 therein. The first flexible bracket 108A comprises two apertures 120A and 120B (shown in FIG. 4) and the second flexible bracket 108B comprises two apertures 122A and 122B (shown in FIG. 4).

Figure 4:
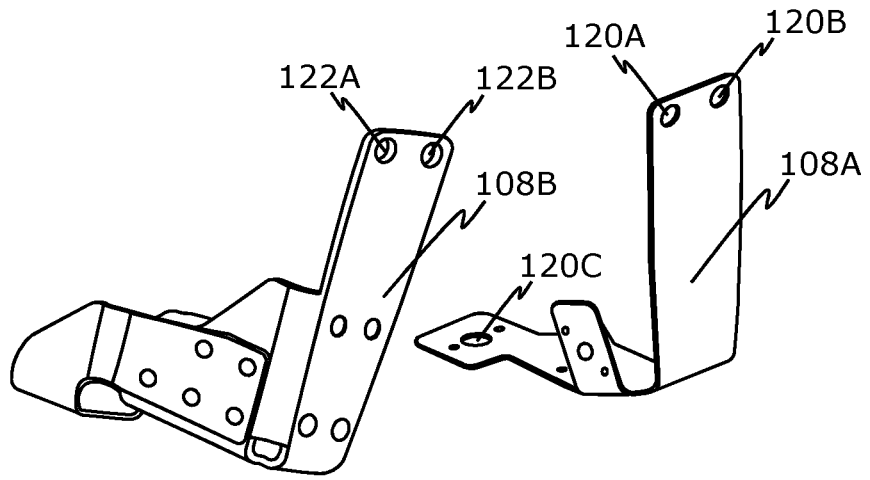
FIG. 4 is a perspective view of the pair of flexible brackets of FIG. 1, in accordance with an embodiment of the present disclosure.

Referring to FIG. 4, there is shown a perspective view of the pair of flexible brackets 108 of FIG. 1, in accordance with an embodiment of the present disclosure. As shown, the first flexible bracket 108A comprises the two apertures 120A and 120B on the planar face thereof that couples to the second side of the engine casing 104. Moreover, the first flexible bracket 108A comprises an aperture 120C on another planar face thereof that couples to the second side of the fairing panel 102. Furthermore, the second flexible bracket 108B comprises the two apertures 122A and 122B on the planar face thereof that couples to the second side of the engine casing 104. Moreover, the second flexible bracket 108B comprises an aperture (not shown) on another planar face thereof that couples to the second side of the fairing panel 102.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An arrangement for coupling a fairing panel to an engine casing, the arrangement comprising:

a pair of rigid brackets having a specific stiffness, wherein the pair of rigid brackets couple a first side of the fairing panel to a first side of the engine casing; and a pair of flexible brackets comprising a first flexible bracket having a first stiffness and a second flexible bracket having a second stiffness greater than the first stiffness, wherein the first stiffness and the second stiffness are less than the specific stiffness of the pair of rigid brackets, and wherein the pair of flexible brackets couple a second side opposite to the first side of the fairing panel to a second side opposite to the first side of the engine casing, wherein a ratio of the second stiffness to the first stiffness is greater than or equal to 10, and the difference between the second stiffness and the first stiffness causes torsional deformation of the fairing panel rather than bending of the fairing panel, thereby preventing an engine out of balance from exciting a vibration mode of the fairing panel.

2. The arrangement of claim 1, wherein the first flexible bracket has at least one chosen from a different shape and a different thickness as compared to the second flexible bracket.

3. The arrangement of claim 1, wherein the first flexible bracket is made of a first material and the second flexible bracket is made of a second material.

4. The arrangement of claim 1, wherein each bracket of the pair of rigid brackets and each bracket of the pair of flexible brackets comprises at least two apertures, each to accommodate a fastener for coupling each bracket of the pair of rigid brackets and each bracket of the pair of flexible brackets to each of the fairing panel and the engine casing.

* * * * *